United States Patent
Ono et al.

[11] Patent Number: 5,078,518
[45] Date of Patent: Jan. 7, 1992

[54] THERMAL VARIABLE SPEED VERTICAL AND HORIZONTAL BAR CODE PRINTER

[75] Inventors: Yoshiaki Ono; Makoto Takahashi, both of Shizuoka, Japan

[73] Assignee: Tokyo Electric Co., Ltd., Tokyo, Japan

[21] Appl. No.: 631,357

[22] Filed: Dec. 20, 1990

[30] Foreign Application Priority Data

Dec. 22, 1989 [JP] Japan .................. 1-331128

[51] Int. Cl.$^5$ .............................................. B41J 5/00
[52] U.S. Cl. ................................. 400/103; 400/120
[58] Field of Search ........................ 400/120, 103; 346/76 PH; 235/432, 433, 494; 364/471, 518, 519

[56] References Cited

U.S. PATENT DOCUMENTS

| | | | |
|---|---|---|---|
| 4,611,001 | 4/1987 | Takai et al. | 400/103 |
| 4,641,147 | 3/1987 | Sakura et al. | 400/120 |
| 4,675,692 | 6/1987 | Goshima et al. | 346/76 PH |
| 4,734,713 | 3/1988 | Sato | 346/76 PH |
| 4,824,266 | 4/1989 | Fujii et al. | 400/120 |
| 4,862,194 | 8/1989 | Uematsu | 400/120 |
| 4,884,904 | 12/1989 | Berquist | 400/103 |
| 4,996,539 | 2/1991 | Haraga et al. | 400/120 |
| 5,007,748 | 4/1991 | Lee et al. | 400/103 |

FOREIGN PATENT DOCUMENTS

| | | | |
|---|---|---|---|
| 60206679 | 10/1960 | Japan . | |
| 0273864 | 11/1987 | Japan | 400/103 |
| 63-230345 | 9/1988 | Japan . | |
| 2072098 | 9/1981 | United Kingdom | 400/103 |
| 2077970 | 12/1981 | United Kingdom | 400/103 |

8605303 9/1986 World Int. Prop. O. .

OTHER PUBLICATIONS

"Bar Code Printing Using Hybrid Dot Bar Matrix", IBM Tech. Disclosure Bulletin, vol. 32, No. 10a, 3/90, pp. 269-271.

*Primary Examiner*—Eugene H. Eickholt
*Attorney, Agent, or Firm*—Frishauf, Holtz, Goodman & Woodward

[57] ABSTRACT

A printing apparatus comprises a step motor for feeding paper in a paper feed direction, an interface for inputting printing data including bar code data, an image buffer for storing bit image data representing at least first and second bar codes which correspond to the same bar code data input by the interface, a thermal head having a row of heating elements perpendicular to the paper feed direction for printing the bit image data stored in the image buffer in units of lines on the paper, and a control circuit for driving the step motor to feed the paper in order to print the bit image data, and for driving the thermal head each time the paper is fed by a preset amount. In the printing apparatus, the first and second bar codes represented by the bit image data are constituted by a set of bar code elements parallel to the paper feed direction and a set of bar code elements perpendicular thereto, respectively, and the control circuit drives the step motor to feed the paper at a first speed in order to print a portion of the bit image data corresponding to the first bar code and at a second speed slower than the first speed in order to print a portion of the bit image data corresponding to the second bar code.

5 Claims, 13 Drawing Sheets

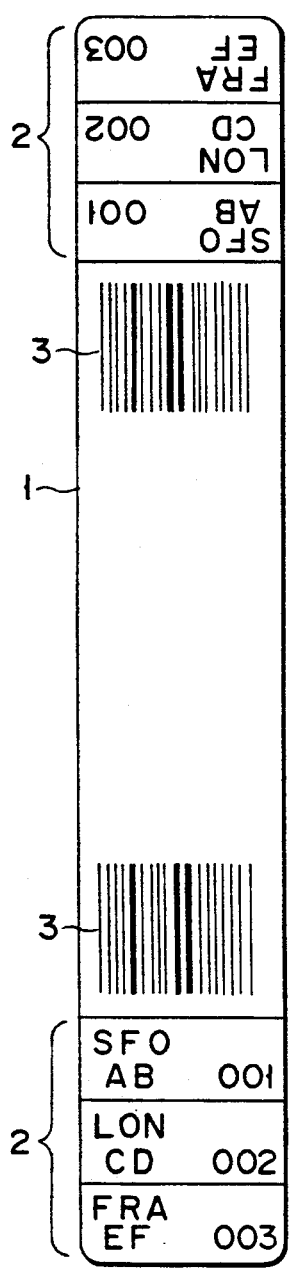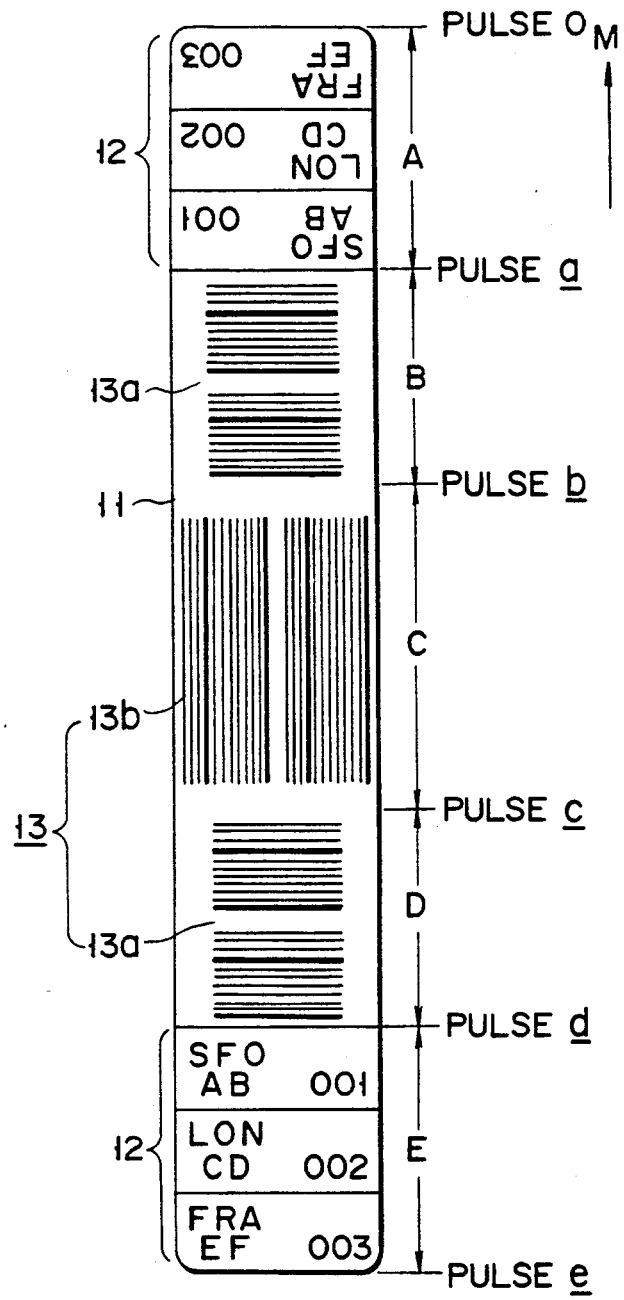
FIG. 1
PRIOR ART
FIG. 2

THERMAL VARIABLE SPEED VERTICAL AND HORIZONTAL BAR CODE PRINTER

BACKGROUND OF THE INVENTION

1. Field of the Invention

The present invention relates to a printing apparatus capable of printing bar codes and, more particularly, to a printing apparatus for issuing a package tag including bar codes.

2. Description of the Related Art

In airports, air cargoes are managed by using package tags so as not be lost during transportation. Package tags are attached to all the air cargoes and respectively indicate their destinations and transportation means (airlines and flight numbers) as cargo data. As shown in FIG. 1, cargo data is printed on a package tag 1 as character data 2 and bar codes 3. This printing operation is performed by a package tag printer including a thermal head having a row of heating elements.

A conventional package tag printer is operated in the following manner. Printing data for one package tag is converted into bit image data and is stored in an image buffer. The bit image data is read out from the image buffer in units of lines so as to be supplied to a thermal head. Every time continuous paper is fed in a paper feed direction M by a predetermined amount, the thermal head is driven in accordance with one-line bit image data. When all the bit image data is printed on the paper, the printed portion of the paper is cut from the rest of the paper by a cutter and is issued as the package tag 1.

In this package tag 1, the angle at which each bar code 3 is printed is set such that white and black bars are parallel to the paper feed direction M, as shown in FIG. 1. In this case, each heating element of the thermal head is assigned to either a white bar or a black bar of each bar code 3. This assignment is not changed during a printing operation of the bar code 3. The heating elements corresponding to black bars are almost continuously set in an ON state while the bar code 3 is printed, and fluctuations of temperature are suppressed. Therefore, even if the thermal head is driven at a short driving interval, excellent contract can be ensured between the white and black bars. If the bar code 3 is set such that each bar code element is perpendicular to the paper feed direction M, since the respective heating elements are intermittently turned on depending on a combination of white and black bars, the temperature of each heating element may be deviated from an optimal temperature at which excellent contrast can be obtained. This leads to a deterioration in printing quality of the bar code 3.

When the package tag 1 issued by such package printer is actually attached to a corresponding air cargo and is transported to a cargo terminal of an air port, an operator at the cargo terminal urges a bar code reader against a bar code of the package tag 1 so as to cause the bar code reader to read the cargo data. This cargo data is supplied from the bar code reader to a computer system and is registered therein. In a bar code read operation, the operator must urge the bar code reader against the bar code in the proper read direction. For this reason, it is difficult to handle cargoes in large quantities within a short period of time.

SUMMARY OF THE INVENTION

It is an object of the present invention to provide a printing apparatus which allows a bar code to be easily read without deteriorating its printing quality.

In order to achieve the above object, according to the present invention, there is provided a printing apparatus comprising: a feeding section for feeding paper in a paper feed direction; an input section for inputting bar code data as printing data; a buffer memory for storing bit image data representing first and second bar codes which correspond to the same bar code data input by the input section and are constituted by bar code elements parallel to the paper feed direction and bar code elements perpendicular thereto, respectively; a print head for printing on the paper the bit image data stored in the buffer memory, in units of lines, the print head having a row of heating elements arranged in a direction perpendicular to the paper feed direction; and a control section for driving the feeding section to feed the paper at a first speed in order to print a portion of the bit image data corresponding to the first bar code and at a second speed slower than the first speed in order to print a portion of the bit image data corresponding to the second bar code, and for driving the printing section each time the paper is fed by a preset amount.

According this printing apparatus, two types of bar codes can be printed on paper in accordance with bar code data. Since the bar code elements of these bar codes are perpendicular to each other, a bar code reader can be more easily urged against one of the bar codes than the other. Therefore, by reading the data from one of the codes which allows an easier urging operation, the load of an operator is reduced, thus improving the operation efficiency. Especially this apparatus is designed such that the driving interval of the thermal head is set to be long when a bar code constituted by bar code elements perpendicular to the paper feed direction is to be printed. In this case, since the temperature of the thermal head can be accurately controlled, deterioration in printing quality can be prevented. The driving interval of the thermal head is set to be short when a bar code constituted by bar code elements parallel to the paper feed direction is to be printed. Therefore, a considerable decrease in printing speed as a whole can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a view showing a package tag issued by a conventional package tag printer;

FIG. 2 is a view showing a package tag issued by a package tag printer according to an embodiment of the present invention;

DETAILED DESCRIPTION OF THE PREFERRED EMBODIMENT

Figure 3:
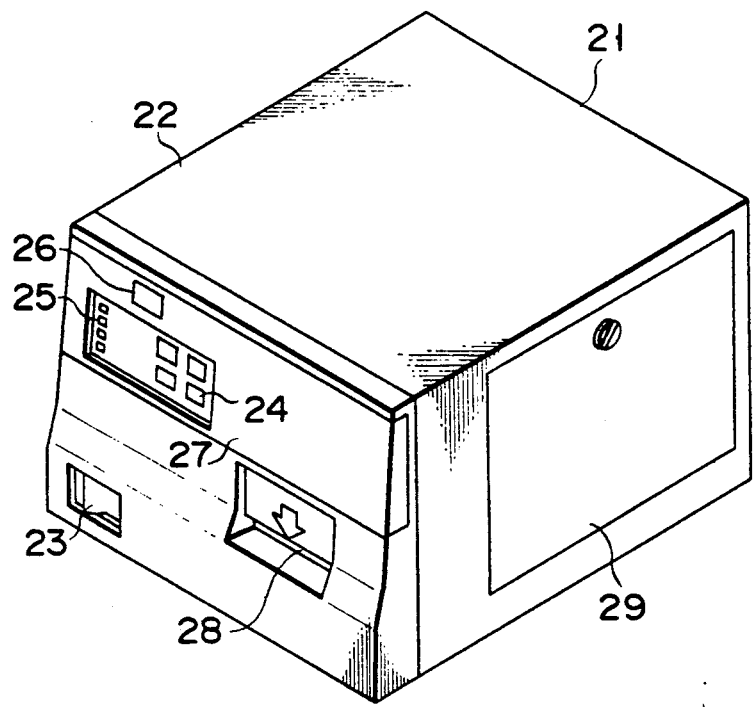
FIG. 3 is a perspective view showing an outer appearance of the package tag printer in FIG. 2.

A package tag printer according to an embodiment of the present invention will be described below with reference to FIGS. 2 to 14. This package tag printer is used to print a package tag shown in FIG. 2.

As shown in FIG. 2, a package tag 11 is designed such that data associated with the destination and transportation means (an air line, a flight number, and the like) of a cargo is printed as character data 12 and bar codes 13. The package tag 11 includes two types of bar codes indicating the same data: a bar code 13a consisting of code elements perpendicular to a paper feed direction M; and a bar code 13b consisting of code elements parallel to the paper feed direction M. The package tag 11 is constituted by a block A corresponding to the field (from a pulse 0 to a pulse a) of the character data 12 on the printing start position side, a block B corresponding to the field (from the pulse a to a pulse b) of the code 13a on the printing start position side, a block C corresponding to the field (from the pulse b to a pulse c) of the bar code 13b in the middle, a block D corresponding to the field (from the pulse c to a pulse d) of the bar code 13a on the printing end position side, and a block E corresponding to the field (from the pulse d to a pulse e) of the character data 12 on the printing end position side. Printing formats are respectively assigned to these blocks.

FIG. 3 shows an outer appearance of a package tag printer 21. The following components are arranged on the front surface of a casing 22: a power source switch 23; an operation panel 27 including a keyboard 24 having various types of operation keys, and an LED 25 and a display unit 26 for indicating operation states; and a tag issue port 28. A door 29 for replenishment of paper is attached to a side surface of the casing 22 so as to be freely opened/closed.

Figure 4:
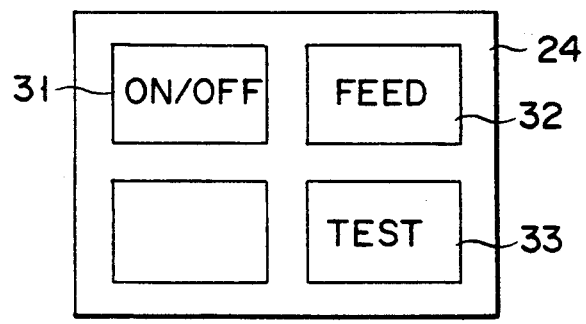
FIG. 4 is a view showing a key arrangement of a keyboard in FIG. 3.

As shown in FIG. 4, the keyboard 24 comprises an ON/OFF key 31 for switching online and offline modes in relation to a host computer, a feed key for designating a paper feed operation, a test key 33 for designating a test mode, and the like.

Figure 5:
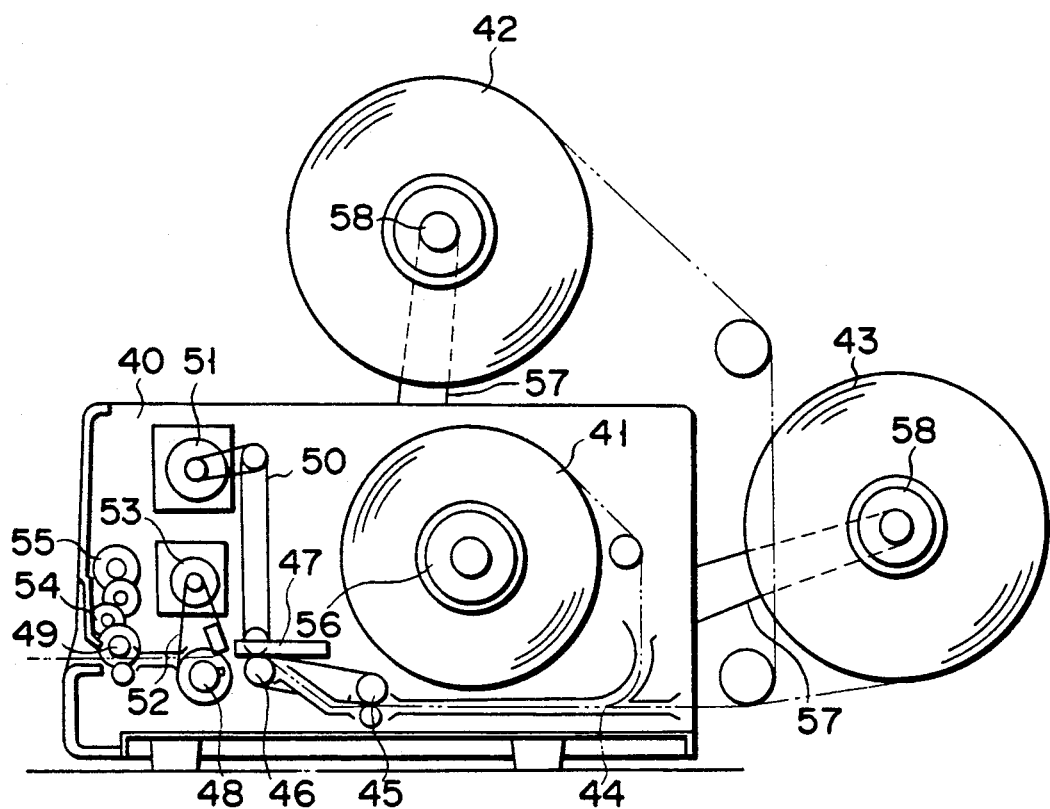
FIG. 5 is a view showing an internal structure of the package tag printer in FIG. 3.

FIG. 5 shows an internal structure of the package tag printer 21. Referring to FIG. 5, reference numeral 40 denotes a frame. A paper path 44 is arranged in the frame 40 so as to guide paper 41, paper 42, and paper 43 having different widths. The following components are sequentially arranged along this paper path 44: feed rollers 45; a platen 46; a thermal head 47 urged against the platen 46; a cutter mechanism 48; and discharge rollers 49. The thermal head 47 has a row of heating elements, perpendicular to the paper feed direction M. In addition, the following components are held by the frame 40 through a transmission mechanism 50: a step motor 51 for driving the platen 46 and the feed rollers 45; a cutter motor 53 for driving a rotary knife of the cutter mechanism 48 through the transmission mechanism 52; and a discharge motor 55 for driving the discharge rollers 49 through the transmission mechanism 54.

The paper 41 is held by a shaft 56 extending from a side surface of the frame 40, whereas the paper 42 and the paper 43 are respectively held by shafts 58 extending from side surfaces of arms 57 protruding outward from the frame 40. The paper 41, the paper 42, and the paper 43 are selectively inserted into the paper path 44. Guide plates (not shown) for respectively guiding the side edges of the paper 41, the paper 42, and the paper 43 in accordance with their widths are arranged on the paper path 44 so as to be freely displaced along the width direction of the paper 41, of the paper 42, and of the paper 43.

Figure 6:
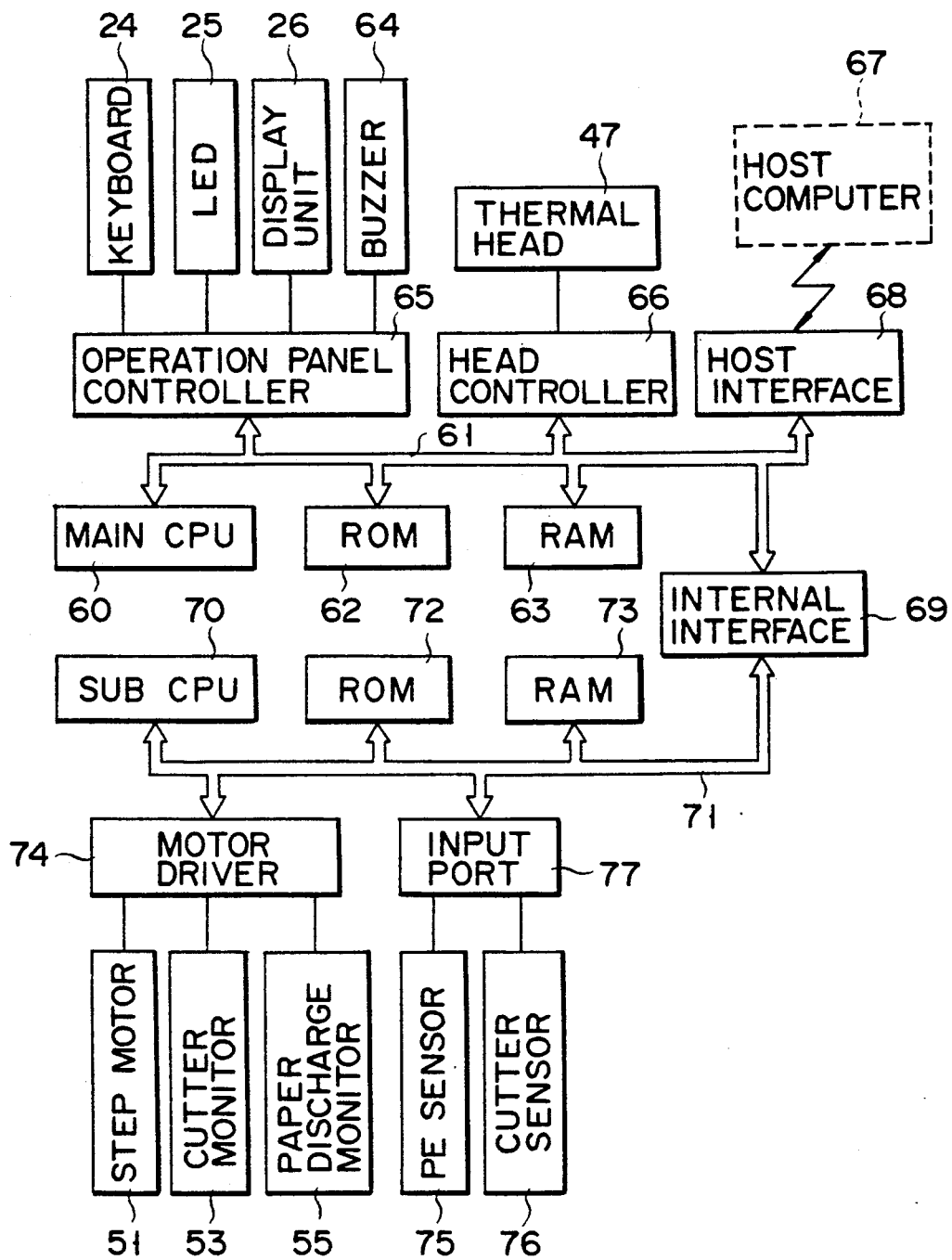
FIG. 6 is a block diagram showing a control circuit of the package tag printer in FIG. 3.

FIG. 6 shows a control circuit of the package tag printer 21 described above. Referring to FIG. 6, reference numeral 60 denotes a main CPU (central processing unit) as a control section main body. The main CPU 60 controls a ROM (read-only memory) 62 and a RAM (random access memory) 63 through a bus line 61. The ROM 62 stores fixed data such as program data, character generation data, and a numerical code/bar code conversion table. The RAM 63 is constituted by various type of memories for storing variable data such as printing data. In addition, the following components are connected to the main CPU 60 through the bus line 61: an operation panel controller 65 for controlling the keyboard 24, the LED 25, the display unit 26, and a buzzer 64 which are arranged on the operation panel 27; a head controller 66 for controlling ON/OFF operations of the heating elements of the thermal head 47; a host interface 68 for performing data communication between the main CPU 60 and a host computer 67; and an internal interface 69.

Figure 7:
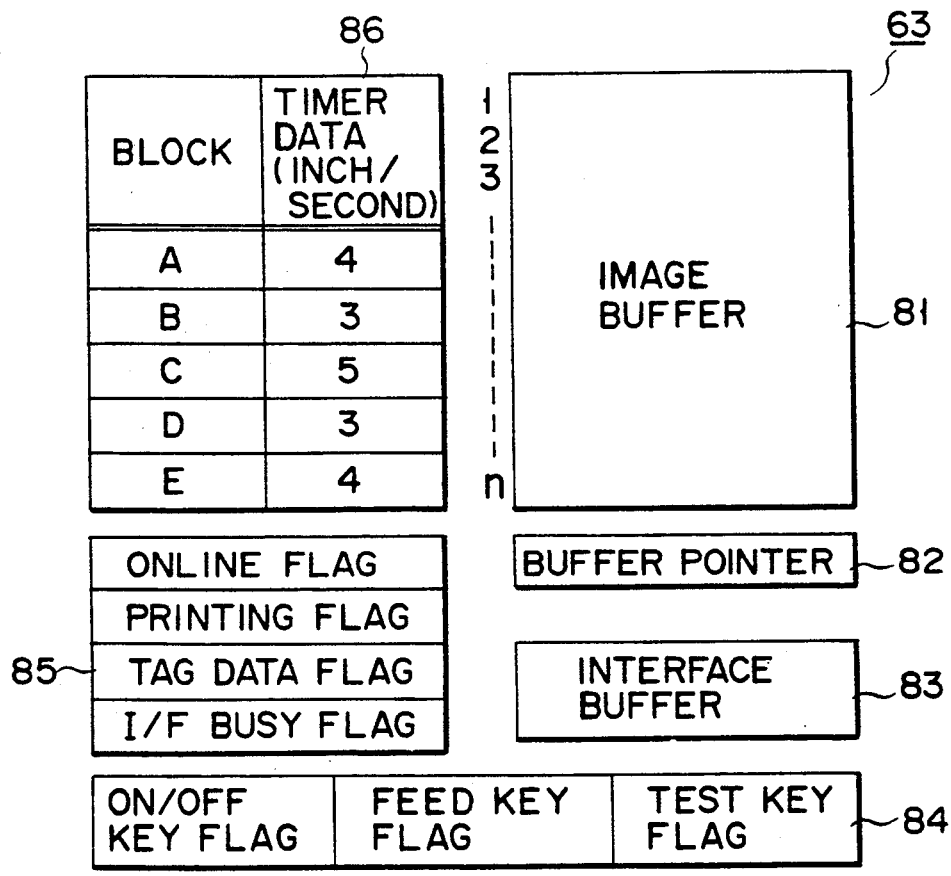
FIG. 7 is a view showing storage areas of a RAM connected to a main CPU in FIG. 6.

Referring to FIG. 7, reference numeral 70 denotes a sub-CPU for controlling feed and discharge operations of the paper 41, the paper 42, and the paper 43. The sub-CPU 70 controls a ROM 72 and a RAM 73 through a bus line 71. The ROM 72 stores fixed data such as program data. The RAM 73 has memory areas for storing variable data such as printing speed data. In addition, the following components are connected to the sub-CPU 70 through the bus line 71: a motor driver 74 for driving the step motor 51, the cutter motor 53 and the discharge motor 55; an input port 77 for receiving signals, e.g., from a paper end (PE) sensor 75 for detecting that no paper is left and from a cutter sensor 76 for detecting the position of the cutter 48; and the internal interface 69. The internal interface 69 serves to control data communication between the main CPU 60 and the sub-CPU 70.

As shown in FIG. 7, the RAM 63 comprises: an image buffer 81 for storing printing data corresponding to one package tag as a bit image; a memory 82 for storing a buffer pointer indicating a read position of the buffer 81; an interface buffer 83 for temporarily storing data received by the host interface 68; a memory 84 for storing various key flags indicating the ON/OFF statuses of the ON/OFF key 31, of the feed key 32, and of the test key 33 on the keyboard 24; a memory 85 for storing various status flags indicating that, e.g., the online mode is being set, printing is being performed, tag data is established, and an interface is busy; and a time data setting memory 86 as a setting means. In the timer data setting memory 86, printing speed data designated by the printing formats of the blocks A to E is stored in advance as timer data (inch/second). In this embodiment, timer data 4 (inch/second) indicating an intermediate speed is set in correspondence with the blocks A and E as character data fields; timer data 3 (inch/second) indicating a low speed is set in correspondence with the blocks B and D as perpendicular bar code fields; and timer data 5 (inch/second) indicating a high speed is set in the block C as a parallel bar code field.

Figure 8:
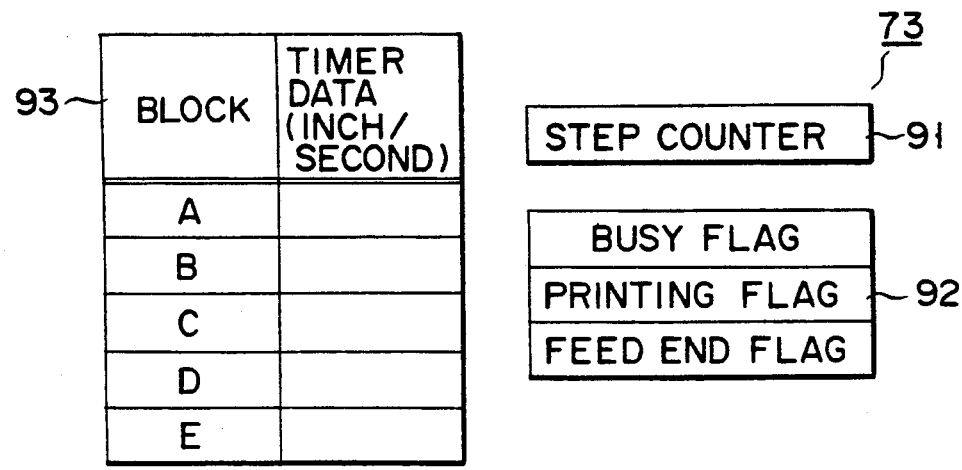
FIG. 8 is a view showing storage areas of a RAM connected to a sub-CPU in FIG. 6.

As shown in FIG. 8, a timer data table 93 is arranged in the RAM 73 in addition to a memory 91 of a step counter for counting the number of steps of the step motor 51, a memory 92 for storing various status flags indicating, e.g., a busy state, a printing state, and a feed end state, and the like. In the timer data table 93, timer data of the blocks constituting the package tag 11 are properly set.

Figure 9A:
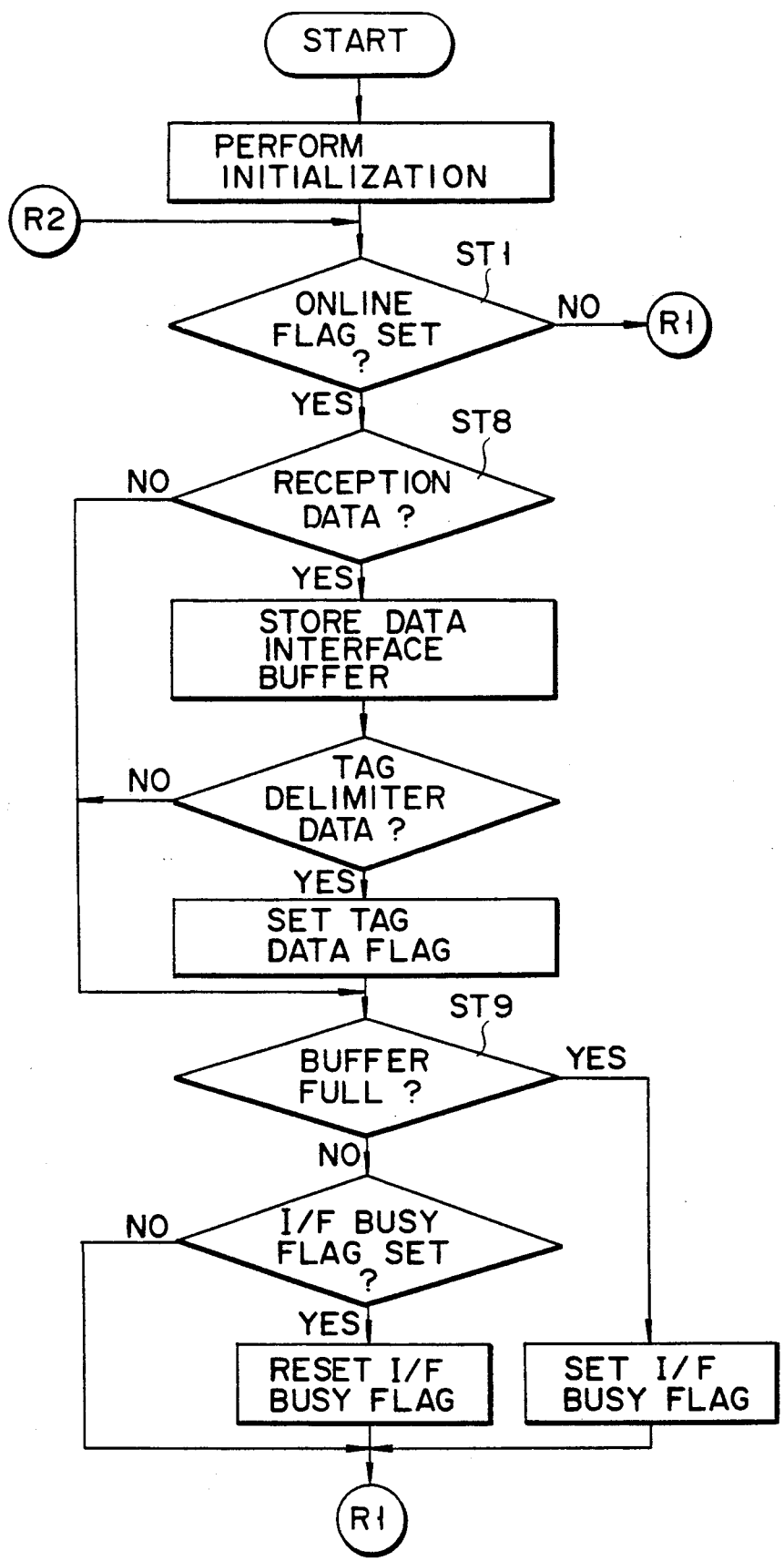
FIGS. 9A to 9C are flow charts showing operations of the main CPU.
Figure 9B:
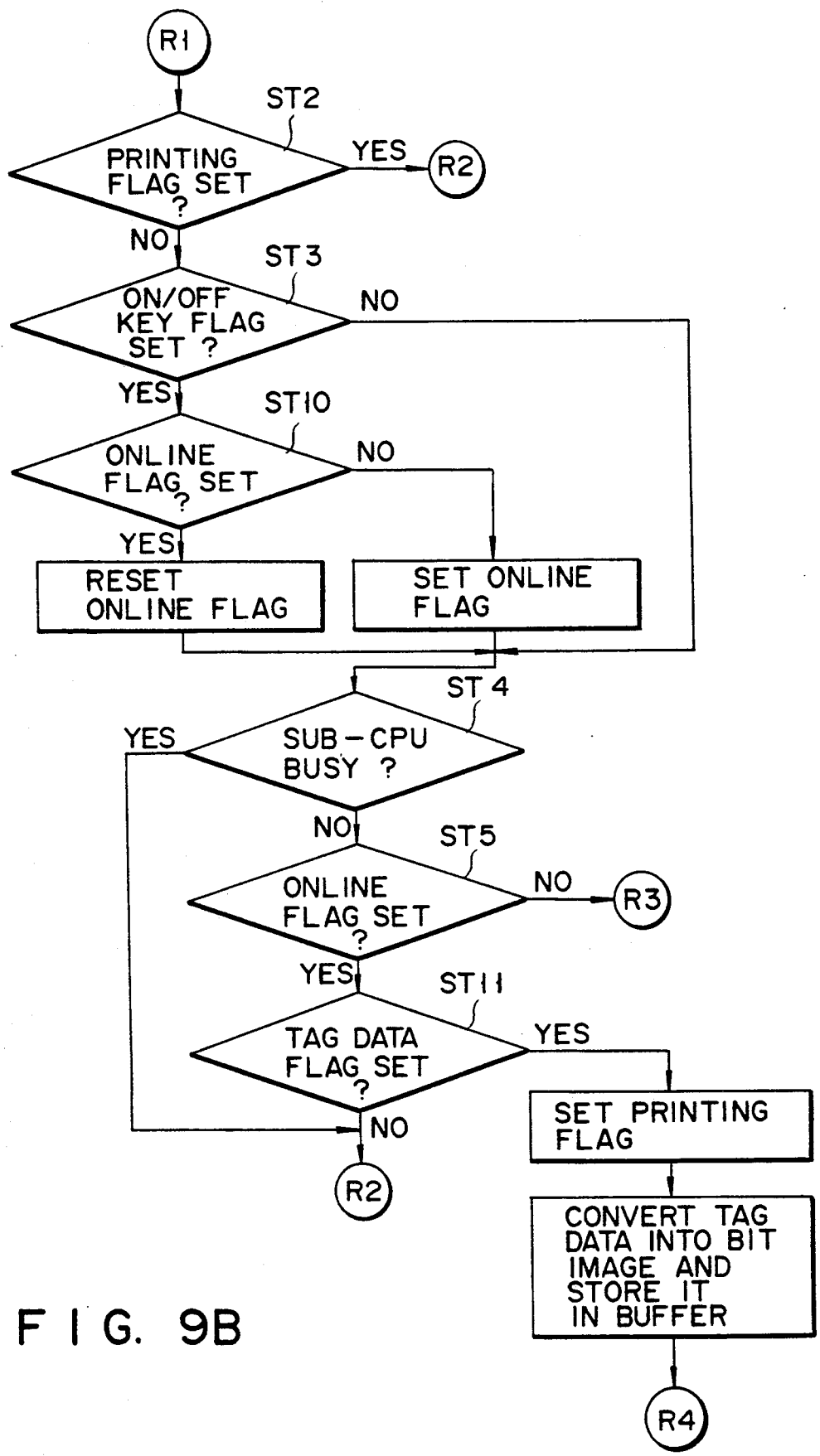
Figure 9C:
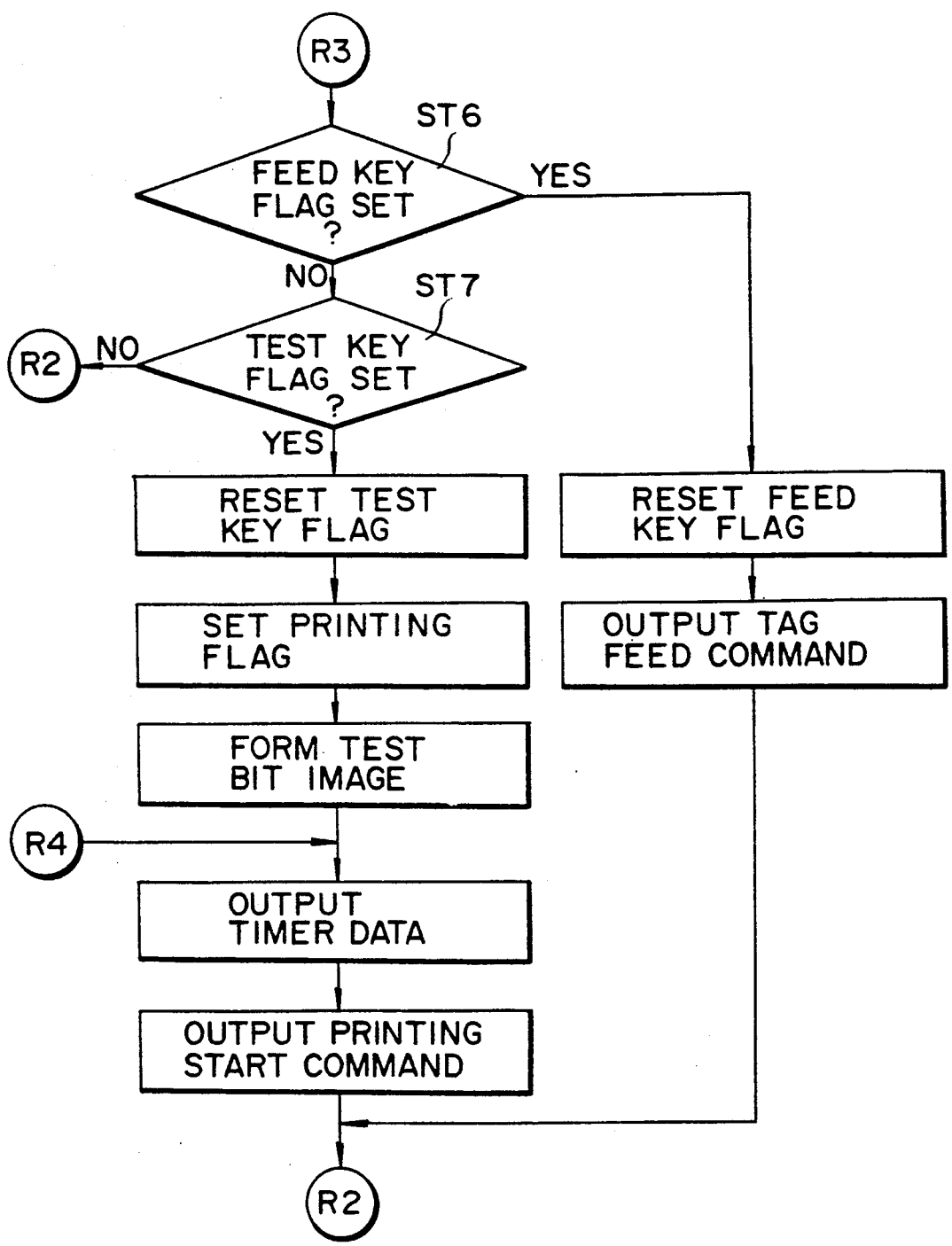

The main CPU 60 is designed to execute operations shown in FIGS. 9A to 9C as a main routine in accordance with program data stored in the ROM 62 after the power source switch 23 is turned on. More specifically, when execution of the main routine is started upon energization, the main CPU 60 initializes the RAM 63 and the like. In step ST1, the main CPU 60 checks an online flag in the status flag memory 85. If the online flag is reset, the main CPU 60 checks a printing flag in the status flag memory 85 in step ST2. If the printing flag is reset, the main CPU 60 checks an ON/OFF key flag in the key flag memory 84 in step ST3. If the ON/OFF key flag is reset, the main CPU 60 reads the status of the sub-CPU 70 from the internal interface 69 in step ST4. If the main CPU 60 receives a status signal indicating a busy state, the flow returns to step ST1. Otherwise, the main CPU 60 checks the online flag in the status flag memory 85 again in step ST5. If the online flag is reset, the main CPU 60 checks a feed key flag in the key flag memory 84 in step ST6. If the feed key flag is reset, the main CPU 60 checks a test key flag in the key flag memory 84 in step ST7. If it is determined that the test key flag is reset, the flow returns to step ST1.

If YES in step ST1, the main CPU 60 checks in step ST8 whether data from the host computer 67 in received by the host interface 68. If YES in step ST8, the main CPU 60 stores the reception data in the interface buffer 83. At this time, the main CPU 60 also checks whether the reception data is delimiter data of printing data corresponding to one package tag. If delimiter data is determined, since it means that printing data for one package tag is transmitted from the host computer 67, the main CPU 60 sets a tag data flag in the status flag memory 85. Otherwise, the above-mentioned processing is not performed. Subsequently, in step ST9, the main CPU 60 checks whether the interface buffer 83 is full. If YES in step ST9, the main CPU 60 sets an interface busy flag in the status flag memory 85. The flow then advances to step ST2. If NO in step ST9, the main CPU 60 checks the interface busy flag. If the flag is set, the main CPU 60 resets it, and the flow advances to step ST2. If the flag is reset, the flow immediately advances to step ST2. Note that if it is determined in step ST8 that no data is received, the flow immediately advances to step ST9. The main CPU 60 checks the status of the interface buffer 83 and sets or resets the interface busy flag as needed. The flow then advances to step ST2. If it is determined in step ST2 that the printing flag is set, the flow returns to step ST1.

If it is determined in step ST3 that the ON/OFF key flag is set, the main CPU 60 checks the online flag in the status flag memory 85 in step ST10. If the online flag is reset, the main CPU 60 sets the flag, and vise versa. The flow then advances to step ST4.

If it is determined in step ST5 that the online flag is set, the main CPU 60 checks the tag data flag in the status flag memory 85 in step ST11. If the tag data flag is reset, the flow returns to step ST2. In contrast to this, if the tag data flag is set, since it means that printing data of one package tag is transmitted from the host computer 67, the printing flag in the status flag memory 85 is set. Subsequently, printing data for one package tag stored in the interface buffer 83 is converted into a bit image and is set in the image buffer 81. In addition, timer data items for blocks A to E are read out from the timer data setting memory 86 and are output to the sub-CPU 70 through the internal interface 69. Thereafter, a printing start command is output to the sub-CPU 70 through the internal interface 69, and the flow returns to step ST2.

If it is determined in step ST6 that the feed key flag is set, the feed key flag is reset. A tag feed command is then output to the sub-CPU 70 through the internal interface 69, and the flow returns to step ST2.

If it is determined in step ST7 that the test key flag is set, the test key flag is reset, and the printing flag in the status flag memory 85 is set. Subsequently, test bit image data stored in the ROM 72 in advance is read out and is set in the image buffer 81. In addition, timer data items for blocks A to E are read out from the timer data setting memory 86 and are output to the sub-CPU 70 through the internal interface 69. After this operation, a printing start command is output to the sub-CPU 70 through the internal interface 69, and the flow returns to step ST2.

Figure 10:
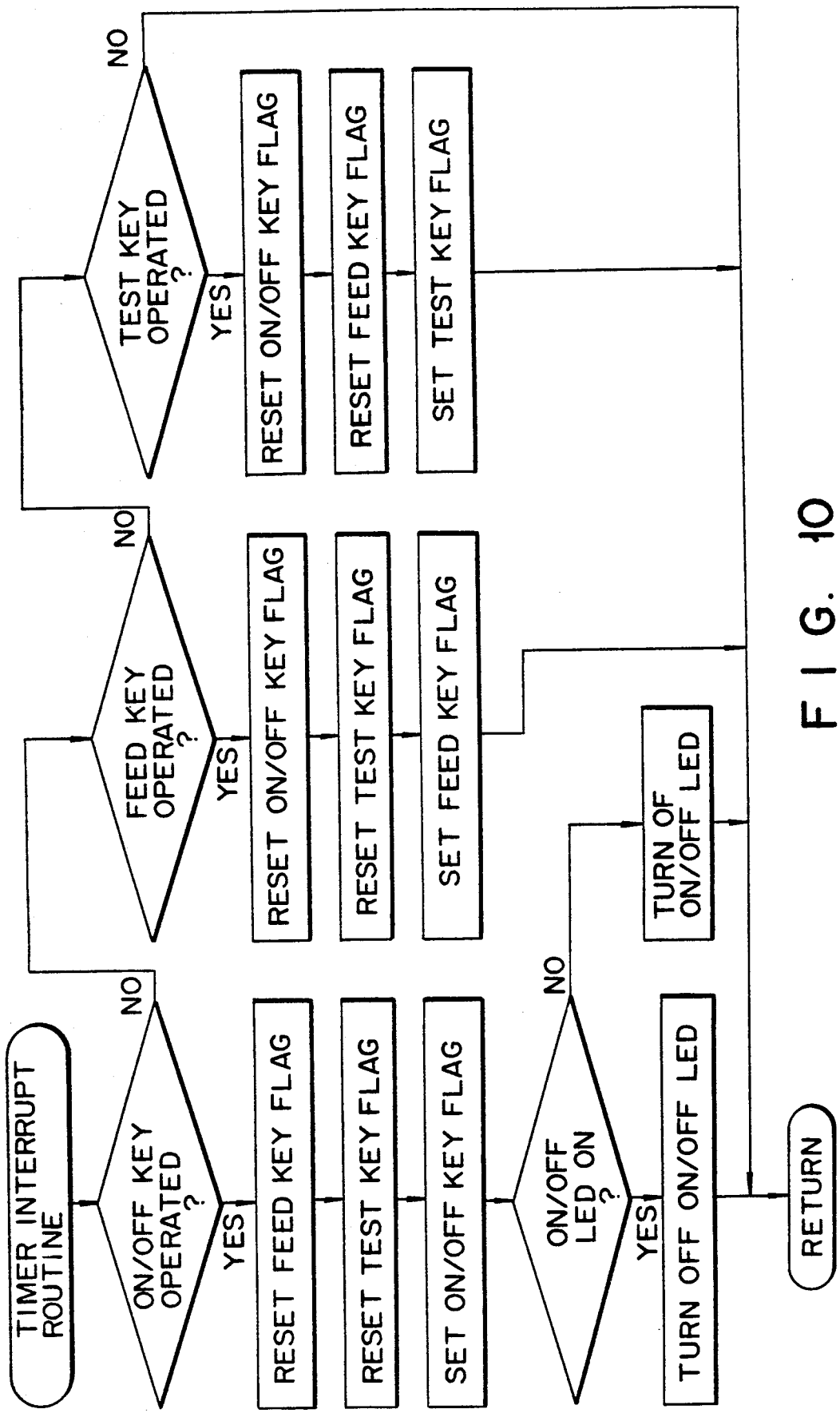
FIGS. 10 and 11 are flow charts each showing a subroutine to be executed during an operation of the main CPU.

The main CPU 60 is programmed to execute an interrupt routine shown in FIG. 10 during the execution of the main routine by, e.g., a 20-msec timer interrupt. More specifically, when a timer interrupt is generated to start the interrupt routine, the main CPU 60 checks the key-input state of the keyboard 24 through the operation panel controller 65. If it is determined that the ON/OFF key 31 is operated, the feed key flag and the test key flag in the key flag memory 84 are reset, and the ON/OFF key flag is set. Thereafter, the main CPU 60 checks the state of an LED element, of the LED 25, which indicates an online/offline switching state. If the LED element is turned on, since it means that the online mode is switched to the offline mode, the LED element is turned off, and the flow then returns to the main routine. In contrast to this, if the LED element is turned off, since it means that the offline mode is switched to the online mode, the LED element is turned on, and the flow then returns to the main routine.

If it is determined that the feed key 32 is operated, the ON/OFF key flag and the test key flag in the key flag memory 84 are reset, and the feed key flag is set. Thereafter, the flow returns to the main routine.

If the test key 33 is operated, the ON/OFF key flag and the feed key flag in the key flag memory 84 are reset, and the test key flag is set. The flow then returns to the main routine.

Figure 11:
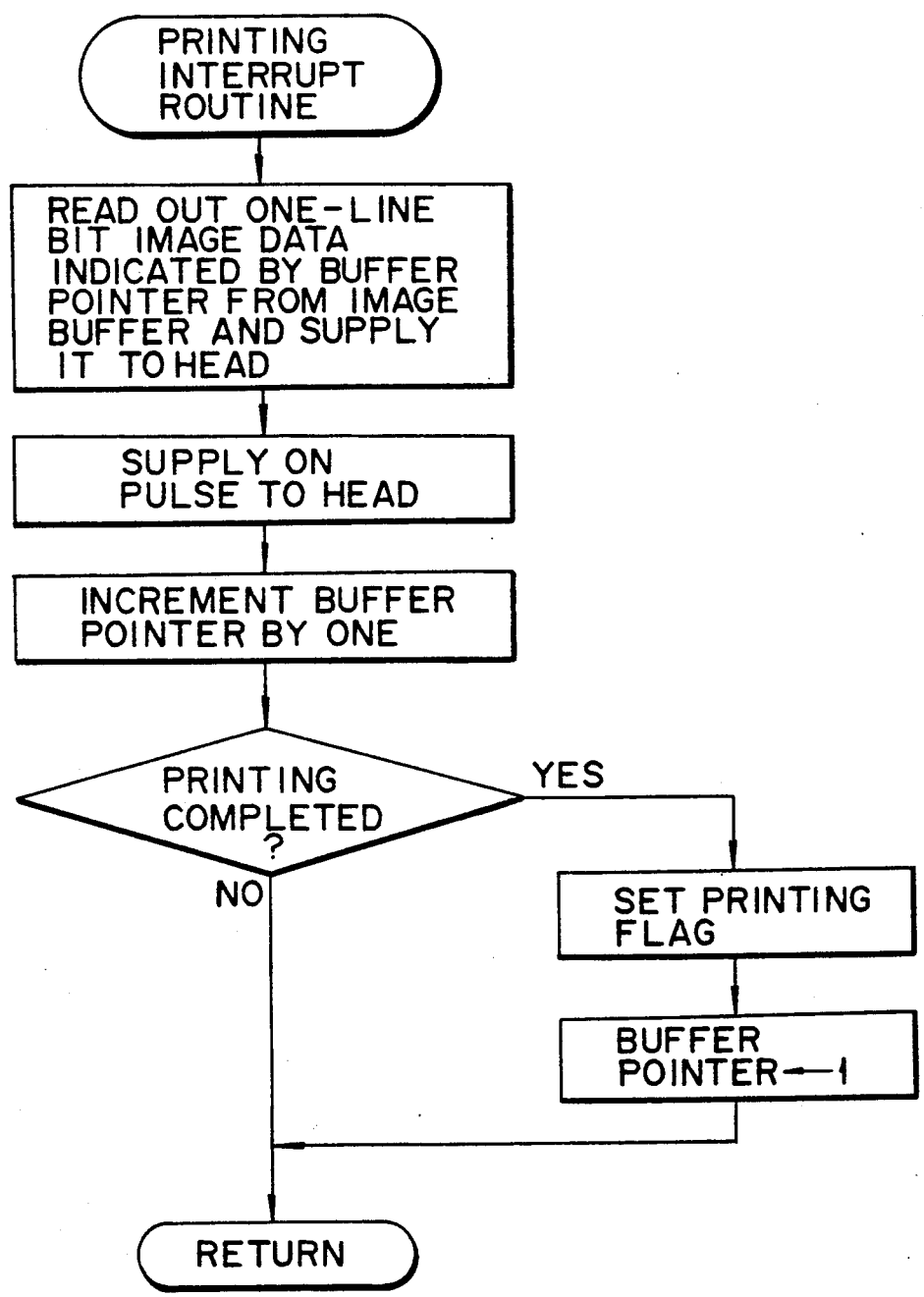

In addition, the main CPU 60 is programmed to execute a printing interrupt routine shown in FIG. 11 when receiving a printing sync signal from the sub-CPU 70 during the execution of the main routine. More specifically, when the main CPU 60 starts the printing interrupt routine upon reception of a printing sync signal through the internal interface 69, it reads out one-line bit image data, indicated by a buffer pointer in the buffer pointer memory 82, from the image buffer 81 and supplies it to the head controller 66, along with an ON pulse. After this operation, the pointer in the buffer pointer memory 82 is incremented by one, and the flow returns to the main routine. If, however, the updated buffer pointer exceeds the number of lines of printing data for one package tag set in the image buffer 81, it is determined that printing is completed, and the printing flag in the status flag memory 85 is reset. Subsequently, the buffer pointer is initialized to be "1", and the flow returns to the main routine.

Figure 12:
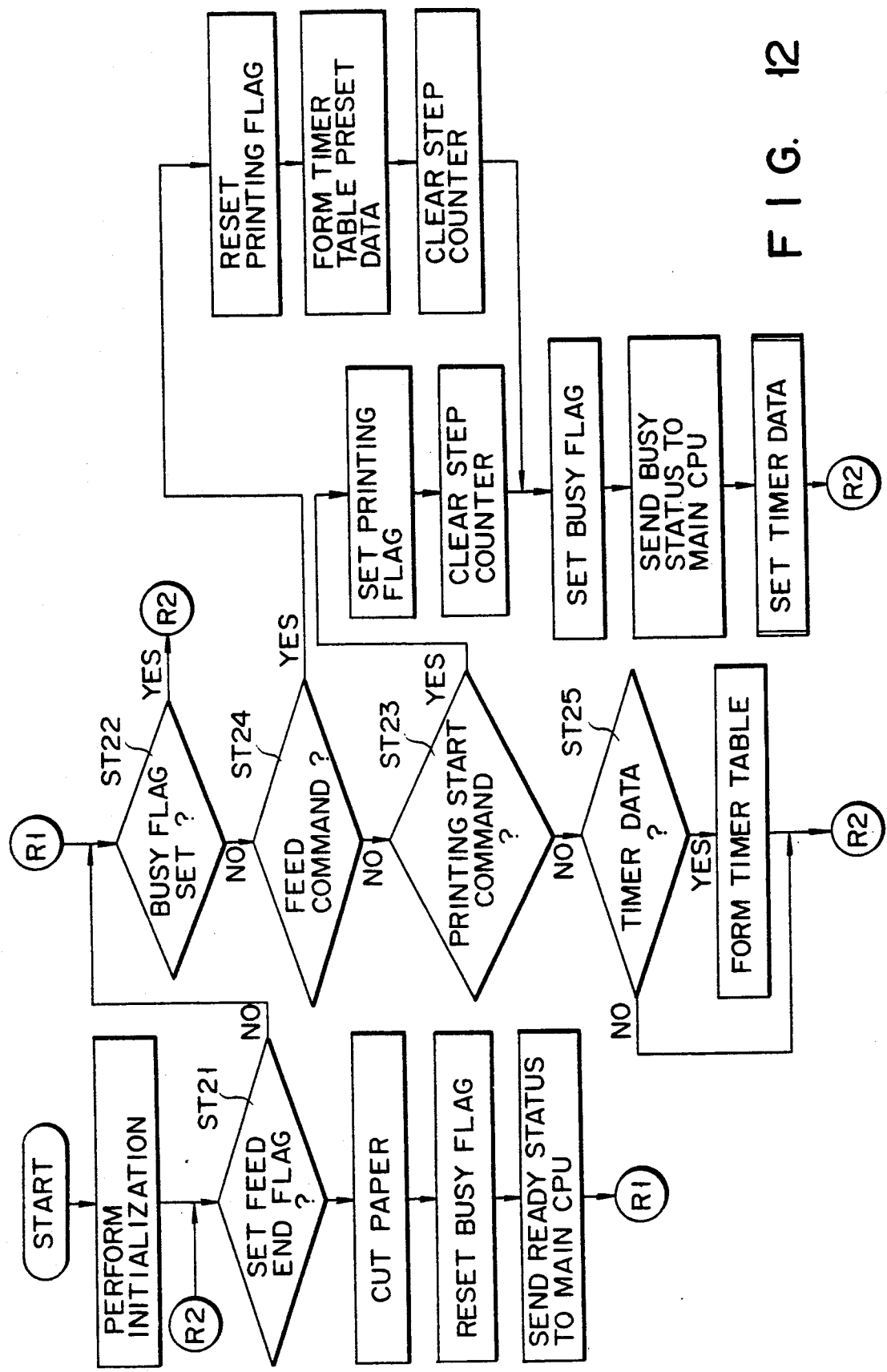
FIG. 12 is a flow chart showing an operation of the sub-CPU.

The sub-CPU 70 is designed to execute a main routine shown in FIG. 12 in accordance with program data stored in the ROM 72 after the power source switch 23 is turned on. More specifically, when the main routine is started upon energization, the sub-CPU 70 initializes the RAM 73, input port 77, and the like. In step ST21, the sub-CPU 70 checks a feed end flag in the status flag memory 92. If the feed end flag is reset, the sub-CPU 70 checks a busy flag in the status flag memory 85 in step ST22. If the busy flag is reset, the sub-CPU 70 checks whether data or a command is sent from the main CPU 60 through the internal interface 69. If no data or command is received, the flow returns to step ST21.

In contrast to this, if it is determined in step ST25 that time data for the blocks A to E are received from the main CPU 60, each time data is stored in a corresponding area of the timer data table 93 to form a timer table. The flow then returns to step ST21.

If it is determined in step ST23 that a printing start command is received from the main CPU 60, the printing flag in the status flag memory 92 is set. In addition, the step counter in the counter memory 91 is cleared to be "0". Furthermore, the busy flag in the status flag memory is set. Thereafter, sub-CPU 70 sends a busy status to the main CPU 60 through the internal interface, and executes a timer data setting operation shown in FIG. 13. The flow then returns to step ST22.

Figure 13:
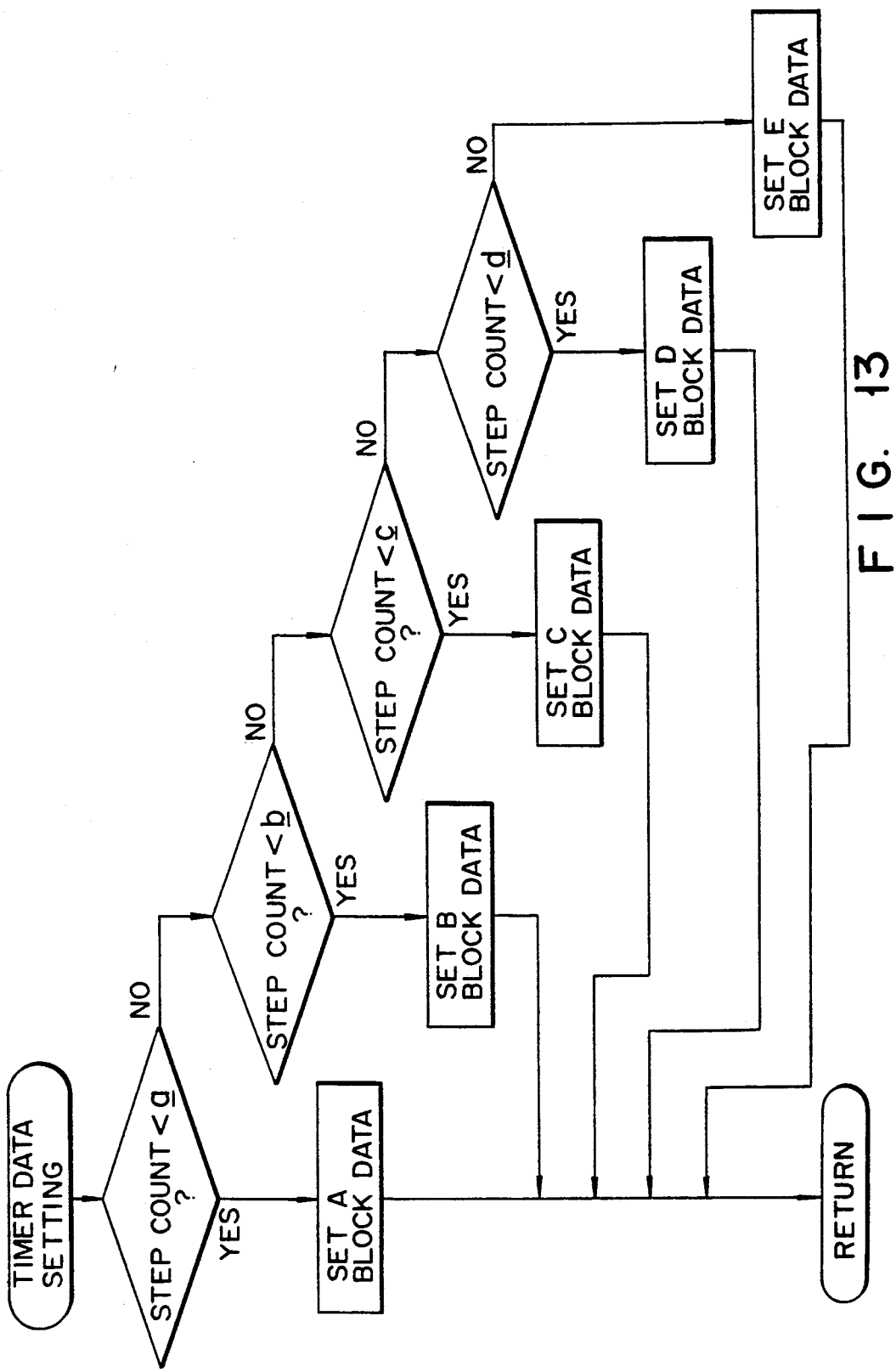
FIGS. 13 and 14 are flow charts each showing a subroutine to be executed during an operation of the sub-CPU.

If it is determined in step ST24 that a feed command is received from the main CPU 60, the printing flag in the status flag memory 92 is reset. In addition, the timer data table 93 is formed by using predetermined timer data, common to the respective blocks, stored in the ROM 72, and the step counter in the counter memory 91 is cleared to be "0". Furthermore, the busy flag in the status flag memory 92 is set. Thereafter, a busy status is sent to the main CPU 60 through the internal interface, and the timer data setting operation shown in FIG. 13 is executed. The flow then returns to step ST22.

When the above-mentioned timer data setting operation is started, the count value of the step counter in the count memory 91 is sequentially compared with pulse count values "a", "b", "c", and "d" corresponding to the boundaries of the blocks A to E constituting the package tag 11, as shown in FIG. 13. If the count value is less than the pulse count value "a", timer data corresponding to the block A of the timer data table 93 is set in a timer incorporated in the sub-CPU 70, and the flow returns to the main routine. If the count value is equal to or greater than the pulse count value "a" and less than the pulse count value "b", timer data corresponding to the block B of the timer data table 93 is set in the timer incorporated in the sub-CPU 70. Similarly, if the count value is equal to or greater than the pulse count value "b" and less than the pulse count value "c", timer data corresponding to the block C of the timer data table 93 is set in the timer. If the count value is equal to or greater than the pulse count value "c" and less than the pulse count value "d", timer data corresponding to the block D of the timer table 93 is set in the timer. If the count value is larger than the pulse count value "d", timer data corresponding to the block E of the timer data table 93 is set in the timer. Thereafter, the flow returns to the main routine.

Figure 14:
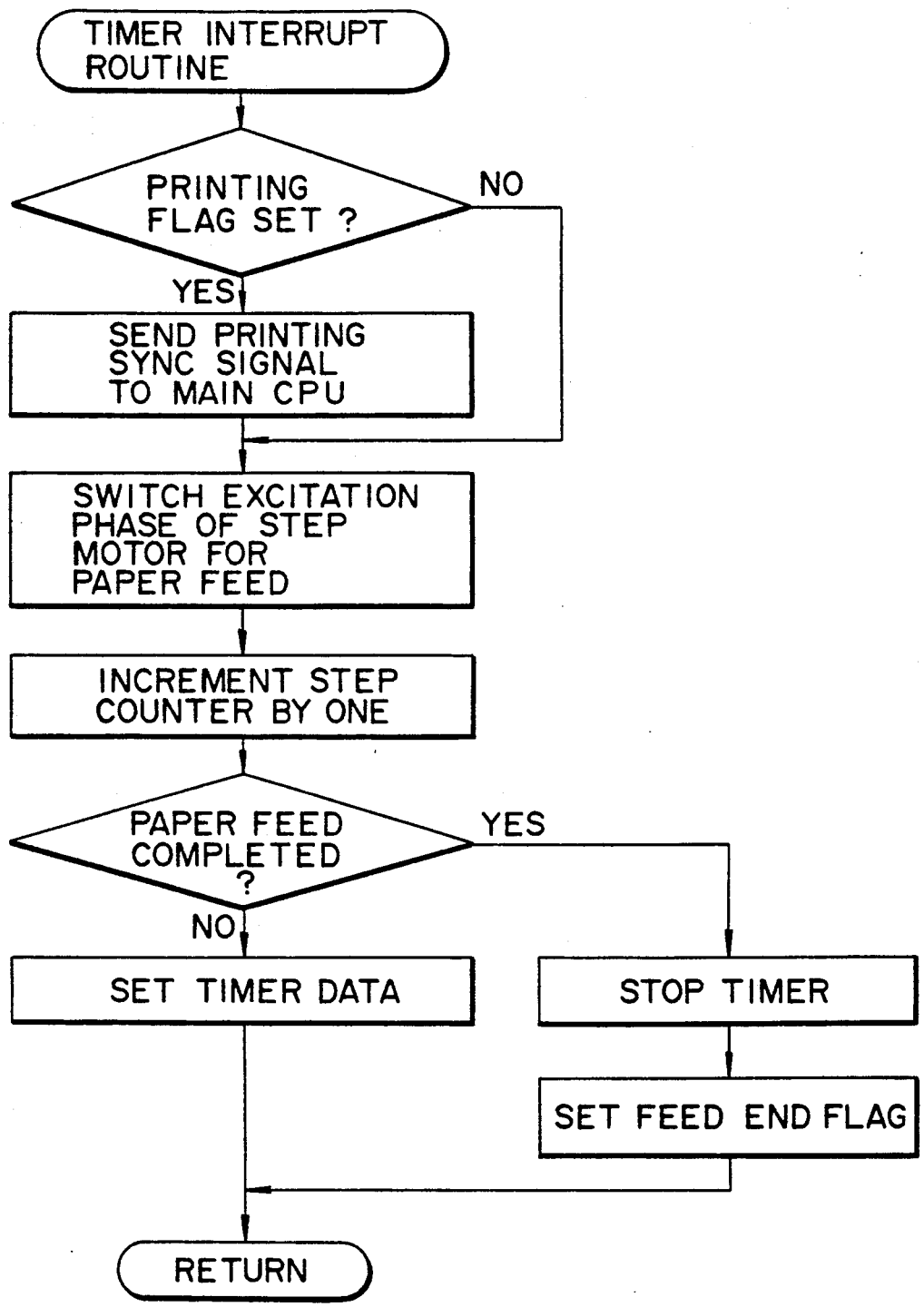

The sub-CPU 70 is programmed to execute an interrupt routine shown in FIG. 14, when the timer data is set in the built-in timer, by the corresponding timer interrupt. More specifically, when the interrupt routine is started upon generation of a timer interrupt, the sub-CPU 70 checks the printing flag in the status flag memory 92. If the flag is set, the sub-CPU 70 sends a printing sync signal to the main CPU 60 through the internal interface 69. If the printing flag is reset, no printing sync signal is sent. Subsequently, the motor driver 74 is controlled to drive the step motor 51 in the next excitation phase, and the step counter of the counter memory 91 is incremented by one. The sub-CPU 70 then checks whether the count value of the step counter reaches a preset value (corresponding to the pulse count value "e") at which printing of one package tag is completed. If the count value does not reach the preset value, the timer data setting operation shown in FIG. 13 is executed again, and the flow returns to the main routine. In contrast to this, if the count value reaches the preset value, it is determined that paper feed is completed, and the timer is stopped. In addition, the feed end flag in the status flag memory 92 is set, and the flow returns to the main routine.

In the package tag printer 21 having the above-described arrangement, if the power source switch 23 is turned on, and the ON/OFF key 31 is operated to select the online mode (the online flag is set, and the online/offline LED element is turned on), the printer 21 is ready to receive printing data for one package tag from the host computer 67. If printing data of one package tag is transmitted from the host computer 67 in this state, the printing data is temporarily is stored in the interface buffer 83 under the control of the main CPU 60, and is converted into blocks of bit image data. The bit image data are then set in the image buffer 81, and timer data for blocks are set in the timer data setting memory 86. Each timer data is then output to the sub-CPU 70 and is stored in the timer data table 93. In this state, the start of a printing operated is designated by the main CPU 60. Subsequently, the step counter of the counter memory 91 is reset to "0", and timer data (4 (inch/second), in this case) for the block A is set first in the timer on the sub-CPU 70 side. With this operation, the step motor 51 is driven step by step at an intermediate speed so as to feed paper by four inches per second. Each time the step motor 51 is driven by one step, one-line bit image data is extracted from the image buffer 81 so as to be printed on the paper by the thelma head 47.

When the step motor 51 is driven step by step by an amount corresponding to the pulse a to print the character data 12 for the block A on the paper, timer data (3 (inch/second) in this case) for the block B is set in the timer on the sub-CPU 70 side. With this operation, the step motor 51 is driven step by step at a low speed so as to feed the paper by three inches per second. Each time the step motor 51 is driven by one step, corresponding one-line bit image data is extracted from the image buffer 81 to be printed on the paper by the thermal head 47.

When the step motor 51 is driven step by step by an amount corresponding to the pulse b, and the bar code 13a corresponding to the block B is printed on the paper, timer data (5 (inch/second) in this case) for the block C is set in the timer on the sub-CPU 70 side. With this operation, the step motor 51 is driven step by step at a high speed so as to feed the paper by five inches per second. Each time the step motor 51 is driven by one step, corresponding one-line bit image data is extracted from the image buffer 81 to be printed on the paper by the thermal head 47.

When the step motor 51 is driven step by step by an amount corresponding to the pulse c, and the bar code 13b corresponding to the block C is printed on the paper, timer data (3 (inch/second) in this case) for the block D is set in the timer on the sub-CPU 70 side. With this operation, the step motor 51 is driven step by step at a low speed so as to feed the paper by three inches per second. Each time the step motor 51 is driven by one step, corresponding one-line bit image data is extracted from the image buffer 81 to be printed on the paper by the thermal head 47.

When the step motor 51 is driven step by step by an amount corresponding to the pulse d to print the bar code 13a corresponding to the block D on the paper, timer data (4 (inch/second) in this case) for the block E is set in the timer on the sub-CPU 70 side. With this operation, the step motor 51 is driven step by step at an intermediate speed to feed the paper by four inches per second. Each time the step motor 51 is driven by one step, corresponding one-line image buffer data is extracted from the image buffer 81 to be printed on the paper by the thermal head 47.

When the step motor 51 is driven step by step by an amount corresponding to the pulse e to print the character data 12 corresponding to the block E on the paper, the cutter motor 53 is driven to cause the cutter to cut the printed portion of the paper from the rest thereof. As a result, the package tag 11 shown in FIG. 1 is issued from the tag issue port 28.

According to the package tag printer of this embodiment, in printing of the bar code 13a having the code elements perpendicular to the paper feed direction M of the package tag 11, the paper feed speed is set to be low so as to set a long driving interval. In this case, the heating elements of the thermal head 47 are intermittently turned on. However, since the driving interval of the thermal head is set to be long enough to be free from the influences of a combination of white and black bars, the bar code 13a having strong contrast between black and white bars can be printed.

In contrast to this, in printing of the bar code 13b having the bar code elements parallel to the paper feed direction M, the printing speed is set to be high so as to a short driving interval. In this case, the heating elements of the thermal head 47 are almost continuously turned on. Therefore, the perpendicular bar code 13b can have sufficiently high quality even if the paper feed speed is set to be high. This increase in paper feed speed can compensate for the above-mentioned decrease in printing speed which is caused when the perpendicular bar code 13a is printed.

Note that when the character data 12 is to be printed, the paper feed speed is set to be an intermediate speed between the speeds at which the perpendicular and parallel bar codes 13a and 13b are respectively printed. With this setting, excellent printing quality can be ensured, and a decrease in printing speed is prevented.

According to the above-described embodiment, therefore, the package tag 11 on which two types of bar codes having bar code elements perpendicular to each other are printed can be issued without decreasing the printing speed. As a result, when the bar code data of the package tag 11 attached to a package is to be read, since the read orientation of the bar code reader can be matched with a bar code by rotating the bar code reader through about 45° at maximum, a read operation can be simplified to improve the operation efficiency.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A printing apparatus comprising:
   feeding means for feeding paper in a paper feed direction;
   input means for inputting printing data including bar code data;
   memory means for storing bit image data representing at least first and second bar codes which each correspond to the same bar code data input by said input means and are constituted by a set of bar code elements parallel to the paper feed direction and a set of bar code elements perpendicular thereto, respectively;
   printing means, having a row of heating elements perpendicular to the paper feed direction, for printing the bit image data stored in said memory means, in units of lines, on the paper; and
   control means for driving the feeding means to feed the paper at a first speed in order to print a portion of the bit image data corresponding to the first bar code and at a second speed slower than the first speed in order to print a portion of the bit image data corresponding to the second bar code, and for driving the printing means each time the paper is fed by a preset amount.

2. A printing apparatus according to claim 1, wherein said said control means includes a table memory for storing items of speed data assigned to portions of said bit image data, and a counter memory for storing data indicating that line of the bit image data which is being printed.

3. A printing apparatus according to claim 2, wherein said control means includes means for selecting the speed data items stored in said table memory in accordance with the line indicated by the data stored in said counter memory so as to determine a current paper feed speed.

4. A printing apparatus according to claim 3, wherein said control means includes a signal generating means for repeatedly generating a drive pulse at an interval corresponding to the current paper feed speed determined by said selecting means, and said feeding means includes a step motor for feeding paper by said preset amount in response to the drive pulse generated by said signal generating means.

5. A printing apparatus according to claim 1, wherein said bit image data further represents character data, and said control means includes means for setting the paper feed speed at a third speed in order to print a portion of the bit image data corresponding to the character data, said third speed being intermediate between said first and second speeds.

* * * * *